US009488229B2

(12) United States Patent
Meier et al.

(10) Patent No.: US 9,488,229 B2
(45) Date of Patent: Nov. 8, 2016

(54) LOW-FRICTION, ABRASION RESISTANT REPLACEABLE BEARING SURFACE

(71) Applicant: Extreme Technologies, LLC, Vernal, UT (US)

(72) Inventors: Gilbert Troy Meier, Vernal, UT (US); James D. Osterloh, West Richland, WA (US)

(73) Assignee: Extreme Technologies, LLC, Vernal, UT (US)

( * ) Notice: Subject to any disclaimer, the term of this patent is extended or adjusted under 35 U.S.C. 154(b) by 0 days.

(21) Appl. No.: 14/746,119

(22) Filed: Jun. 22, 2015

(65) Prior Publication Data

US 2015/0285310 A1    Oct. 8, 2015

Related U.S. Application Data

(63) Continuation-in-part of application No. 14/018,066, filed on Sep. 4, 2013, now abandoned.

(60) Provisional application No. 61/696,738, filed on Sep. 4, 2012.

(51) Int. Cl.
| | | |
|---|---|---|
| *F16C 33/02* | (2006.01) | |
| *F16C 43/02* | (2006.01) | |
| *F16C 33/04* | (2006.01) | |
| *F16C 33/26* | (2006.01) | |

(52) U.S. Cl.
CPC ............. *F16C 43/02* (2013.01); *F16C 33/043* (2013.01); *F16C 33/26* (2013.01); *F16C 2206/04* (2013.01); *F16C 2226/60* (2013.01); *F16C 2240/40* (2013.01); *Y10T 29/49647* (2015.01); *Y10T 29/49696* (2015.01)

(58) Field of Classification Search
CPC ...... F16C 33/043; F16C 33/26; F16C 43/02; F16C 2352/00; F16C 2240/40; F16C 2206/04; F16C 2226/60; E21B 4/003
USPC .............................. 384/92, 95, 282, 284, 285
See application file for complete search history.

(56) References Cited

U.S. PATENT DOCUMENTS

| | | | |
|---|---|---|---|
| 3,237,705 A | | 3/1966 | Williams et al. |
| 3,762,782 A | * | 10/1973 | Rumbarger ............. F16C 43/06 175/372 |
| 4,285,550 A | * | 8/1981 | Blackburn ............. F16C 29/046 16/25 |
| 5,372,351 A | | 12/1994 | Oliver |
| 5,480,233 A | * | 1/1996 | Cunningham .......... E21B 4/003 384/304 |
| 5,499,688 A | * | 3/1996 | Dennis ................ E21B 10/5673 175/426 |
| 6,257,279 B1 | | 7/2001 | Peltz |
| 6,607,371 B1 | | 8/2003 | Raymond et al. |
| 6,695,080 B2 | | 2/2004 | Presley et al. |

(Continued)

FOREIGN PATENT DOCUMENTS

| | | |
|---|---|---|
| EP | 219959 | 4/1987 |
| WO | WO2008026011 | 3/2008 |

*Primary Examiner* — James Pilkington
(74) *Attorney, Agent, or Firm* — Remenick PLLC (57) ABSTRACT

Low-friction, abrasion resistant systems of replaceable bearing surfaces and methods of using the system are disclosed. The system comprises a device having at least one recess, each recess having a groove in an inner wall of the recess; a plurality of replaceable bearing surfaces adapted to be inserted into and removed from the at least one recess without damaging the device; and at least one snap ring adapted to engage the groove in each recess and secure a replaceable bearing surface within the recess.

22 Claims, 5 Drawing Sheets

SECTION C-C

(56) References Cited

U.S. PATENT DOCUMENTS

| | | |
|---|---|---|
| 6,920,944 B2 | 7/2005 | Eppink et al. |
| 6,973,974 B2 | 12/2005 | McLoughlin et al. |
| 6,991,046 B2 | 1/2006 | Fielder et al. |
| 7,901,137 B1 | 3/2011 | Peterson |
| 7,946,768 B2 * | 5/2011 | Cooley .................. F16C 17/02 175/320 |
| 2012/0057814 A1 | 3/2012 | Dadson et al. |
| 2012/0255786 A1 * | 10/2012 | Isenhour ................. E21B 10/26 175/57 |
| 2013/0180779 A1 * | 7/2013 | Isenhour ................. E21B 44/00 175/45 |

* cited by examiner

SECTION B-B

SECTION A-A

SECTION C-C

LOW-FRICTION, ABRASION RESISTANT REPLACEABLE BEARING SURFACE

REFERENCE TO RELATED APPLICATIONS

This application is a continuation-in-part of U.S. Non-Provisional application Ser. No. 14/018,066, filed Sep. 4, 2013, and entitled "LOW-FRICTION, ABRASION RESISTANT REPLACEABLE BEARING SURFACE," which claims priority to provisional application U.S. Provisional Application Ser. No. 61/696,738, filed Sep. 4, 2012, and entitled "LOW-FRICTION, ABRASION RESISTANT REPLACEABLE BEARING SURFACE," both of which are specifically and entirely incorporated by reference.

BACKGROUND

1. Field of the Invention

The invention is directed to friction reducing devices. In particular, the invention is directed to low-friction, abrasion resistant replaceable friction reducing bearing surfaces.

2. Background of the Invention

Many industries, including but not limited to oil well drilling, machining, mining, quarrying, and transportation, use mechanisms that need to work under high pressure and high temperature conditions. Furthermore, parts of the mechanisms often rub against each other or external surfaces and, therefore, a low friction, abrasion resistant surface in these parts is desired.

One solution, for example, is a bearing surface comprised of Polycrystalline Diamond Compact (PDC), a synthetic diamond that performs under harsh conditions. PDC is diamond grit that has been fused together under high-pressure, high-temperature conditions in the presence of a catalytic metal. The extreme hardness, wear resistance, and thermal conductivity of diamond make it an ideal material for bearings. Individual diamond crystals cleave quite easily when struck parallel to certain planes (the process used to facet diamond gemstones takes advantage of these relatively weak planes). Diamond sintering overcomes the problem of weak planes in diamond gemstones by bonding a mass of small diamond particles onto a larger, coherent structure. Sintered diamond provides greater toughness and durability than single crystals because the individual crystals in a sintered body are randomly oriented. This prevents cracks from propagating along the weak planes where traditional diamond crystals cleave most easily. Sintered diamonds also provide more uniform wear than a single crystal, while maintaining similar thermal conductivity and hardness properties. All of these factors combine to make sintered diamond the ideal material for many bearing applications.

However, overtime, PDC bearings do wear out and can become damaged from intensive use. The PDC bearings are usually embedded into the device by welding and, therefore, in order to replace the PDC bearings, the parts must be removed from operation and transported to a specialized facility that is able to remove the worn out PDC bearings and replace them with new bearings. The process is both costly and time consuming. Furthermore, the repeated heating and cooling needed to replace the bearings causes excessive stress on the devices. Additionally, the welded or brazed bearing pads currently used during refurbishment cannot maintain precision tolerances, especially after multiple replacements. Therefore, it is desirable to have a replaceable low-friction, abrasion resistant bearing surface capable of being replace quickly on-site.

SUMMARY OF THE INVENTION

The present invention overcomes the problems and disadvantages associated with current strategies and designs and provides new tools and methods of providing replaceable low-friction, abrasion resistant bearing surfaces.

One embodiment of the invention is directed to a replaceable bearing surface. The replaceable bearing surface comprises an outer housing and a low-friction, abrasion resistant button secured within the outer housing. The outer housing is adapted to be inserted into and removed from a device without damaging the device.

In the preferred embodiment, the button is comprised of Polycrystalline Diamond Compact (PDC). Preferably, the outer housing is comprised of 41/30 steel. The button is preferably press fit into the outer housing. Preferably, the outer housing has a notched grip portion and the outer housing has a threaded portion. The threaded portion of the outer housing is preferably adapted to mate with a threaded recess in the device.

In the preferred embodiment, the button is hemispherical. Preferably, the outer surface of the button extends beyond at least one surface of the outer housing. Preferably, when installed, button extends beyond an exterior surface of the device.

Another embodiment of the invention is directed to a low-friction, abrasion resistant system. The system comprises a device having at least one recess, a plurality of replaceable bearing surfaces adapted to be inserted into and removed from the at least one recess without damaging the device, each replaceable bearing surface comprising an outer housing, and a low-friction, abrasion resistant button secured within the outer housing.

Preferably, the button is comprised of Polycrystalline Diamond Compact (PDC). In the preferred embodiment, the outer housing is comprised of 41/30 steel. Preferably, the button is press fit into the outer housing. In the preferred embodiment, the outer housing has a notched grip portion and a threaded portion. Preferably, the threaded portion of the outer housing is adapted to mate with a threaded recess in the device.

Preferably, the button is hemispherical. Preferably, the outer surface of the button extends beyond at least one surface of the outer housing. In the preferred embodiment, when installed, button extends beyond an exterior surface of the device. The device is preferably one of a drill bit, a reamer, a cam shaft, a bearing, or an axle.

Another embodiment of the invention is directed to a method of installing and removing a replaceable bearing surface without damaging the device.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is replacing worn out bearing surfaces quickly and on-site. It has been surprisingly discovered that providing a replaceable low-friction, abrasion and impact resistant bearing surface allows technicians to replace worn out bearing surfaces themselves without transporting the device to a specialty facility.

Figure 1:
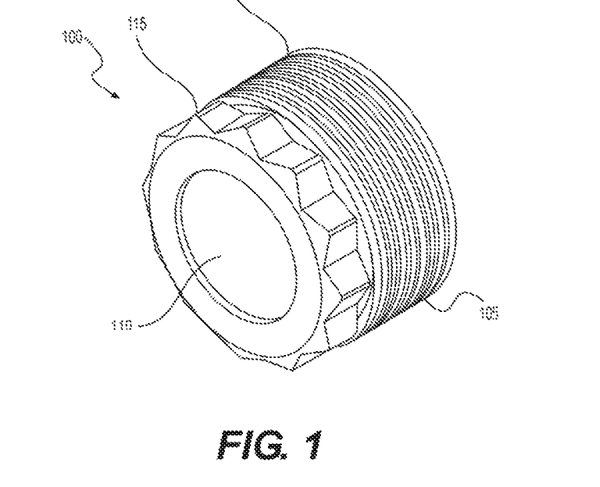
FIG. 1 is an isometric view of an embodiment of the bearing surface of the invention.

FIG. 1 depicts an isometric view of a preferred embodiment of the replaceable bearing surface 100. Bearing surface 100 is comprised of an outer housing 105 and a slider button 110. While one slider button 110 is shown, another number of slider buttons can be used, for example, two or four slider buttons can be used. Preferably, the slider button 110 is a PDC, which has a lower coefficient of friction that carbide or hardened steels. The low coefficient of friction reduces drag during use of the device and thus reduces torque, for example, during drilling of lateral well bores. However, other materials, such as aluminum oxide, silicon carbide, or cubic boron nitride can be used. In the preferred embodiment, slider button 110 is semi-spherical, however other shapes (for example, rectangular, triangular, or semi-ovoidal) can be implemented. Additionally, slider button 110 can be a combination of shapes. Slider button 110 is preferably press fit into outer housing 105. However, slider button 110 can be coupled to outer housing 105, for example, with bolts, screws, adhesive, other fastening devices, or screwed into outer housing 105.

Figure 2:
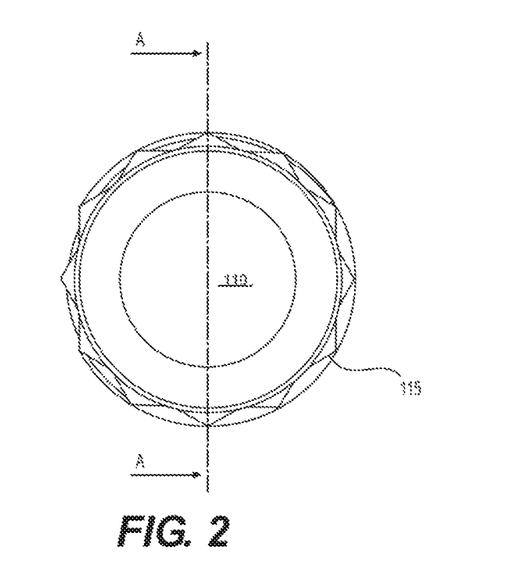
FIG. 2 is a top view of an embodiment of the bearing surface of the invention.

Preferably, outer housing 105 is comprised of 41/30 steel, however other steels or other materials can be used for outer housing 105. For example, nylon, other metals, plastics, carbon-fiber, or other naturally occurring or manmade materials. As can be seen in FIG. 2, outer housing 105 is preferably cylindrical, having an outer diameter of about one inch. However, outer housing 105 can have other dimensions depending on the device into which bearing surface 100 is installed. For example, outer housing 105 can have a diameter of ½ an inch, 2 inches, or 3 inches. Outer housing 105 preferably has a notched portion 115 on the outer diameter, adjacent to slider button 110. Notched portion 115 is preferably adapted to be griped by a wrench, pliers, or a person's fingers. Notched portion 115 preferably aids in installing and uninstalling bearing surface 110 by providing a grippable surface. Outer housing 105 can additionally have other gripping surfaces or a smooth surface. For example, outer housing 105 can have raised knurling, a rubberized grip, or other high friction surfaces.

Figure 3:
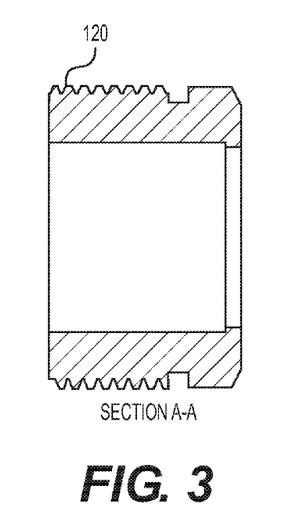
FIG. 3 is a cut-away view of an embodiment of the bearing surface of the invention.

FIG. 3 depicts a cut-away side view of bearing surface 100. Outer housing 105 additionally preferably comprises a threaded portion 120. Threaded portion 120 preferably is able to mate with a threaded socket in the apparatus into which bearing surface 100 is to be installed. In other embodiments, instead of or in addition to treaded portion 120, outer housing 105 may have a spring biased cam, a friction increasing device, a pin, adhesive, or another fastening device to keep bearing surface 100 from unintentionally coming out of the apparatus. Preferably, the coupling device is capable of maintaining the outer housing 105 within the apparatus during use of the apparatus and under high stress and high heat conditions.

Figure 4:
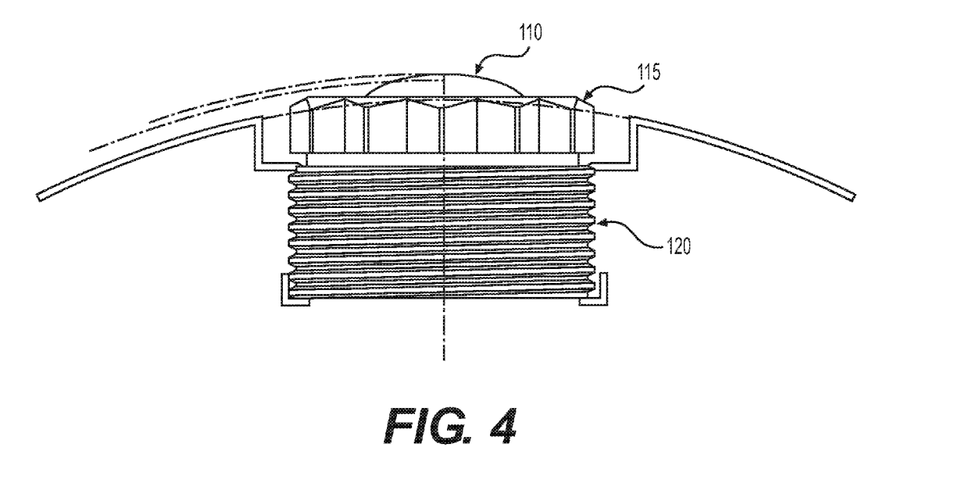
FIG. 4 is a side view of an embodiment of the bearing surface installed in a device.

As shown in FIG. 4, bearing surface 100 is couplable with a device or apparatus. In the preferred embodiment the bearing surface 100 is counter sunk into the device so that only a portion of the bearing surface 100 extends beyond the exterior or the device. For example, only the slider button 110 may extend beyond the exterior of the device. The device can be a drill bit, a reamer, a cam shaft, a bearing, an axle, another machine part, or any other device requiring a low-friction surface. Preferably, the device has a recess with threaded sides that mates with threaded portion 120 of outer housing 105. In embodiments where outer housing 105 has another fixation device, the recess may have other mating devices. Preferably, the bearing surface 100 can be replaced at the location of use of the device with common tools (for example wrenches, pliers, or screw drivers). Preferably, the bearing surface 100 can be replaced without heating and/or cooling the device, thereby reducing the stress on the device caused during the refurbishment techniques used previously. Additionally, the precision tolerances of the devices can be maintained and repeated during replacement of the bearing surface 100. Since the bearing surface 100 can preferably be replaced on-site, a transportation cost savings is realized by reducing the number of trips to repair centers. Furthermore, redundant inventory can be reduced since the time previously necessary for shipping and repair is eliminated.

Figure 5A:
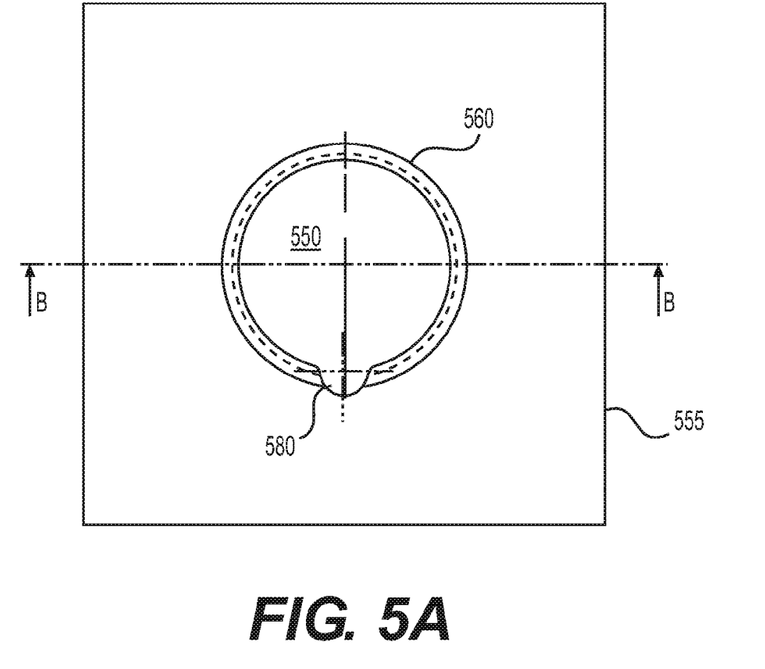
FIGS. 5A-B depict a top and cutaway side view of an embodiment of recess in a device adapted to receive bearing surfaces.
Figure 5B:
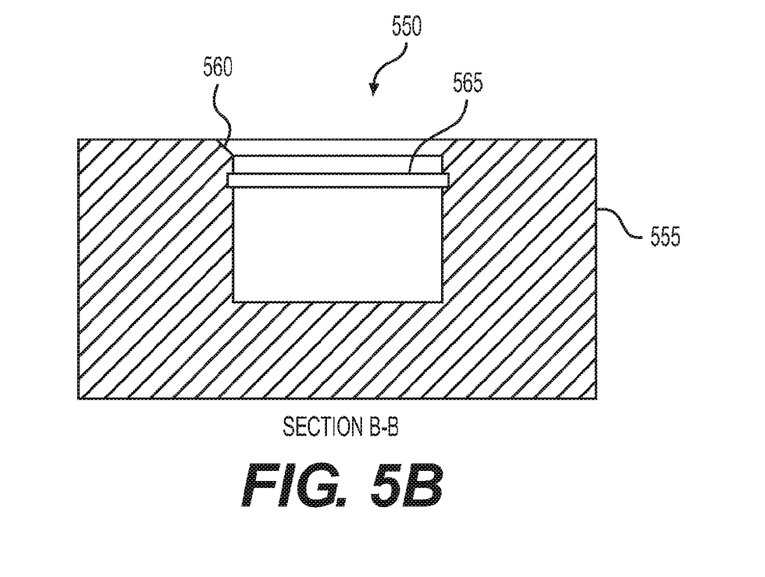

FIGS. 5A-B, 6A-B, 7A-B, and 8A-B depict embodiments of the bearing surface using a snap ring retention device. FIG. 5A is a top view of a recess 550 in a device 555 and FIG. 5B is the cutaway side view thereof. Device 555 can be drill bit, a reamer, a cam shaft, a bearing, an axle, another machine part, or any other device requiring a low-friction surface. Preferably, recess 550 has a cylindrical shape with a flared opening 560. However, recess 550 can have another shape. For example, recess 550 can be semispherical, pyramidal, cubical, or conical. Preferably, a portion of the inner surface of recess 550 is grooved 565. Preferably, groove 565 extends into the body of device 555. In a preferred embodiment, the flared opening 560 of recess 550 may extend further into the body of device 555 than the groove 565 extends. However, in other embodiments the flared opening 560 may be smaller or equal in size to groove 565. Preferably, groove 565 is positioned within the outer third of recess 565. However, groove 565 can have another positioning.

Figure 6A:
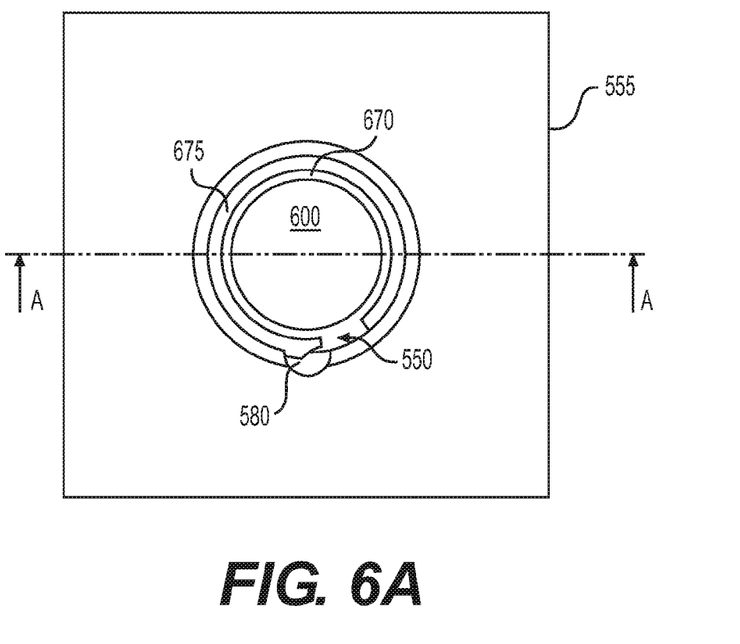
FIGS. 6A-B depict a top and cutaway side view of an embodiment of a bearing surface placed within the recess depicted in FIGS. 5A-B.
Figure 6B:
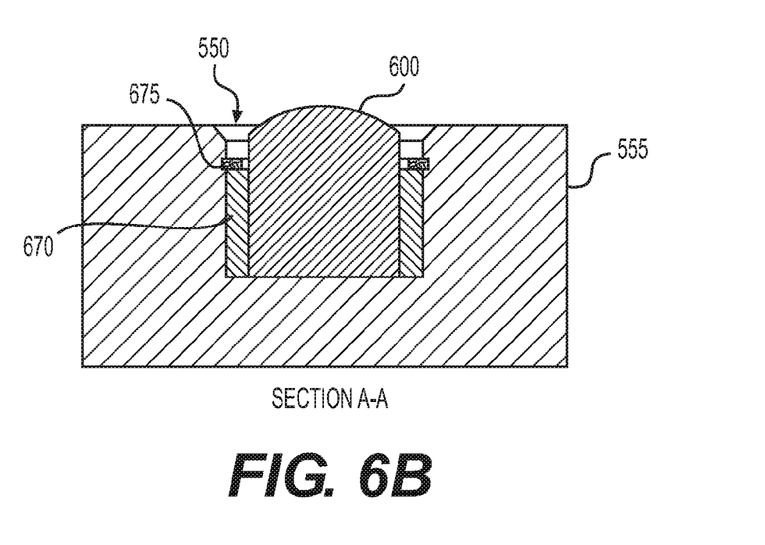

FIG. 6A is a top view of recess 550 with bearing surface 600 placed therein and FIG. 6B is a cutaway side view thereof. Bearing surface 600 may be a PDC, an impact resistant steel, or another material with a low coefficient of friction. Preferably, the coefficient of friction of bearing surface 600 is lower than the coefficient of friction of the material of device 555. Preferably bearing surface 600 is cylindrical in shape with a domed outer surface. However, bearing surface 600 can have another shape, for example spherical, semispherical, cubical, conical, or another shape. Furthermore, bearing surface may have a flat, chamfered, beveled, or other shaped outer surface. Preferably, bearing surface 600 is contained within a collar 670. Collar 670 can be of the same material as bearing surface 600, the same material as device 555, or of another material. Preferably, bearing surface 600 is press fit into collar 670. However, baring surface 600 and collar 670 can be coupled using a different method, for example, adhesive, welding, a threaded coupling, pins, screws, bolts, or another fastening device. Preferably, the outer diameter of collar 670 is slightly smaller than the inner diameter of recess 550 so that when collar 670 and bearing surface 600 are placed within recess 550 they do not move freely. Preferably, once placed within recess 550, bearing surface 600 extends beyond the outer surface of device 555. Preferably, collar 670 extends a portion of the way up bearing surface 650. Preferably, the height of collar 670 is equal to the height of groove 565 such that when collar 670 and bearing surface 600 are placed within recess 550 the upper surface of collar 670 is adjacent to groove 565.

A snap ring 675 is preferably inserted over collar 670 and into groove 565 to retain collar 670 and bearing surface 600 in recess 550. Snap ring (or retaining ring) 675 is preferably a removable device that can be squeezed into recess 550 and then extend into groove 565 such that a portion of snap ring 675 is within groove 565 and a portion of snap ring 675 extends over collar 670. In other embodiments, collar 670 can be held into recess 550 by a spring loaded cam, a pin, a screw, adhesive, a clevis, or another fastening device. Additionally recess 550 may have an opening 580 by which snap ring 675 can be squeezed for insertion and removal. In the preferred embodiment, to replace bearing surface 600, snap ring 675 is removed, the broken or used bearing surface 600 and collar 670 are then removed. A new bearing surface 600 and collar 670 are inserted into recess 550 and snap ring 675 (either the original or a replacement) is inserted into groove 565.

Figure 7A:
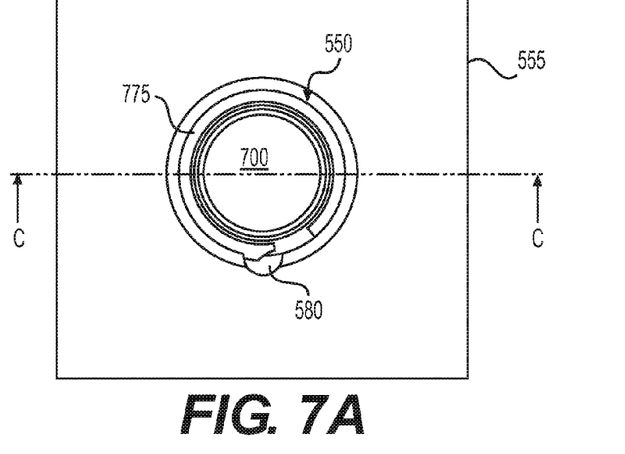
FIGS. 7A-B depict a top and cutaway side view of another embodiment of a bearing surface placed within the recess depicted in FIGS. 5A-B.
Figure 7B:
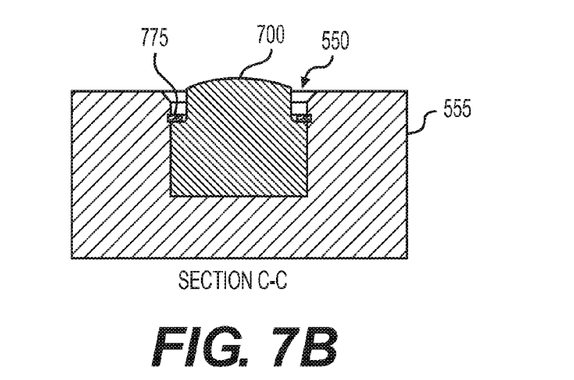
Figure 8A:
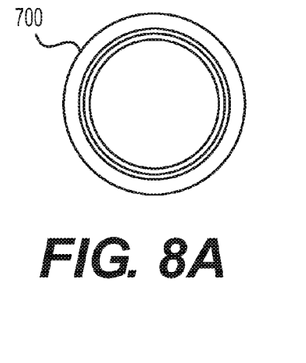
FIGS. 8A-B depict a top and side view of the embodiment of the bearing surface depicted in FIGS. 7A-B.
Figure 8B:
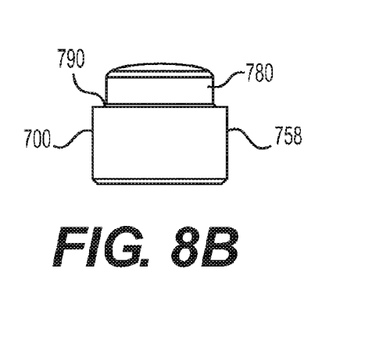

FIG. 7A is a top view of recess 550 with bearing surface 700 placed therein and FIG. 7B is a cutaway side view thereof. FIGS. 8A and 8B are top and side views of bearing surface 700. Bearing surface 700 may be a PDC, an impact resistant steel, or another material with a low coefficient of friction. Preferably, the coefficient of friction of bearing surface 700 is lower than the coefficient of friction of the material of device 555. Preferably, bearing surface 700 is a single unit that is cylindrical in shape with an upper portion 780 has a smaller radius than the lower portion 785. Preferably, the outer surface of upper portion 780 is domed. However, bearing surface 600 can have another shape, for example spherical, semispherical, cubical, conical, a combination thereof, or another shape. Furthermore, bearing surface may have a flat, chamfered, beveled, or other shaped outer surface. Preferably, there is a transition zone 785 between the upper portion 780 and the lower portion 785. Preferably, the outer diameter of lower portion 785 is slightly smaller than the inner diameter of recess 550 so that when bearing surface 700 is placed within recess 550 it does not move freely. Preferably, once placed within recess 550, bearing surface 700 extends beyond the outer surface of device 555. Preferably, the height of lower portion 785 is equal to the height of groove 565 such that when bearing surface 700 is placed within recess 550 the upper surface of lower portion 785 is adjacent to groove 565. In a preferred embodiment, upper portion 780 is milled from lower portion 785. However, upper portion 780 and lower portion 785 can be formed in different methods, for example, 3D printed, molded, etched, lathed, or a different technique.

A snap ring 775 is preferably inserted over lower portion 785 and into groove 565 to retain bearing surface 700 in recess 550. Snap ring (or retaining ring) 775 is preferably a removable device that can be squeezed into recess 550 and then extend into groove 565 such that a portion of snap ring 775 is within groove 565 and a portion of snap ring 775 extends over lower portion 785. In other embodiments, lower portion 785 can be held into recess 550 by a spring loaded cam, a pin, a screw, adhesive, a clevis, or another fastening device. Additionally recess 550 may have an opening 580 by which snap ring 775 can be squeezed for insertion and removal. In the preferred embodiment, to replace bearing surface 700, snap ring 775 is removed, the broken or used bearing surface 700 is then removed. A new bearing surface 700 is inserted into recess 550 and snap ring 775 (either the original or a replacement) is inserted into groove 565.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A low-friction, abrasion resistant system of replaceable bearing surfaces, comprising:
   a device having at least one recess with a bottom, the at least one recess having a groove in an inner wall of the recess;
   a plurality of replaceable bearing surfaces adapted to be inserted into and removed from the at least one recess without damaging the device; and
   at least one snap ring adapted to engage the groove in the at least one recess and secure a replaceable bearing surface against the bottom and within the recess.

2. The system of claim 1, wherein the replaceable bearing surface is comprised of one of steel or Polycrystalline Diamond Compact (PDC).

3. The system of claim 1, further comprising a plurality of collars, wherein each replaceable bearing surface is coupled to a collar.

4. The system of claim 3, wherein a first surface of each collar is adapted to abut a snap ring upon placement within a recess.

5. The system of claim 4, wherein a height of each collar is equal to a height of the groove within the at least one recess as measured from the bottom of the at least one recess to a bottom of the groove.

6. The system of claim 1, wherein each replaceable bearing surface is comprised of a first portion and a second portion, wherein the first portion has a smaller radius than the second portion.

7. The system of claim 6, wherein a first surface of the second portion of each replaceable bearing surface is adapted to abut a snap ring upon placement within a recess.

8. The system of claim 7, wherein a height of each second portion is equal to a height of the groove within the at least one recess as measured from the bottom of the at least one recess to a bottom of the groove.

9. The system of claim 1, wherein each replaceable bearing surface has a domed outer surface.

10. The system of claim 9, wherein the outer surface of each replaceable bearing surface extends beyond an external surface of the device when placed within a recess.

11. The system of claim 1, wherein the device is one of a drill bit, a reamer, a cam shaft, a bearing, or an axle.

12. A method of installing and replacing bearing surfaces in a device, comprising:
providing a device having at least one recess, the at least one recess having a groove in an inner wall of the recess;
removing any damaged or used replaceable bearing surfaces from the at least one recess without damaging the device;
providing a plurality of replaceable bearing surfaces;
inserting one replaceable bearing surface into the at least one recess without damaging the device;
providing a plurality of snap rings;
inserting one snap ring over the replaceable bearing surface within the at least one recess and engaging the snap ring into the groove in the at least one recess to secure the replaceable bearing surface within the recess.

13. The method of claim 12, wherein the replaceable bearing surfaces are comprised of one of steel or Polycrystalline Diamond Compact (PDC).

14. The method of claim 12, wherein providing the plurality of replaceable bearing surfaces further comprises coupling each replaceable bearing surface to a collar.

15. The method of claim 14, wherein a first surface of each collar abuts a snap ring upon placement within the at least one recess.

16. The method of claim 15, wherein a height of each collar is equal to a height of the groove within the at least one recess as measured from the bottom of the at least one recess to a bottom of the groove.

17. The method of claim 12, wherein each of replaceable bearing surfaces comprises a first portion and a second portion, wherein the first portion has a smaller radius than the second portion.

18. The method of claim 17, wherein a first surface of the second portion of each replaceable bearing abuts a snap ring upon placement within the at least one recess.

19. The method of claim 18, wherein a height of each second portion is equal to a height of the groove within the at least one recess as measured from the bottom of the at least one recess to a bottom of the groove.

20. The method of claim 12, wherein each replaceable bearing surface comprises a domed outer surface.

21. The method of claim 20, wherein the outer surface of each replaceable bearing surfaces extends beyond an external surface of the device when placed within the at least one recess.

22. The method of claim 12, wherein the device is one of a drill bit, a reamer, a cam shaft, a bearing, or an axle.

* * * * *

UNITED STATES PATENT AND TRADEMARK OFFICE
CERTIFICATE OF CORRECTION

PATENT NO. : 9,488,229 B2  
APPLICATION NO. : 14/746119  
DATED : November 8, 2016  
INVENTOR(S) : Meier et al.

Page 1 of 1

It is certified that error appears in the above-identified patent and that said Letters Patent is hereby corrected as shown below:

On the Title Page

Item (72) add the following Inventors:  
-- Joseph Aschenbrenner, Blackfoot, ID (US);  
Joshua J. Smith, Vernal, UT (US);  
Lane Snell, Wheat Ridge, CO (US) --

Signed and Sealed this  
Twenty-seventh Day of August, 2019

Andrei Iancu  
*Director of the United States Patent and Trademark Office*